United States Patent
Cariello (10) Patent No.: US 12,481,583 B2
(45) Date of Patent: Nov. 25, 2025

(54) WEAR LEVELING TECHNIQUES USING DATA CHARACTERISTICS

(71) Applicant: Micron Technology, Inc., Boise, ID (US)

(72) Inventor: Giuseppe Cariello, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 57 days.

(21) Appl. No.: 18/630,915

(22) Filed: Apr. 9, 2024

(65) Prior Publication Data

US 2024/0345951 A1    Oct. 17, 2024

Related U.S. Application Data

(60) Provisional application No. 63/459,866, filed on Apr. 17, 2023.

(51) Int. Cl.
*G06F 12/02* (2006.01)

(52) U.S. Cl.
CPC .. *G06F 12/0246* (2013.01); *G06F 2212/7211* (2013.01)

(58) Field of Classification Search
None
See application file for complete search history.

(56) References Cited

U.S. PATENT DOCUMENTS

| | | | |
|---|---|---|---|
| 9,990,279 B2* | 6/2018 | Camp | G06F 12/0246 |
| 2011/0197014 A1* | 8/2011 | Yeh | G06F 12/0246 |
| | | | 711/E12.078 |
| 2012/0246394 A1* | 9/2012 | Ou | G06F 12/0246 |
| | | | 711/E12.008 |
| 2015/0033087 A1* | 1/2015 | Marquart | G06F 11/1048 |
| | | | 714/718 |
| 2017/0168716 A1* | 6/2017 | Shaharabany | G06F 3/0679 |
| 2021/0064288 A1* | 3/2021 | Kanno | G06F 3/0604 |

* cited by examiner

*Primary Examiner* — Stephanie Wu
(74) *Attorney, Agent, or Firm* — Holland & Hart LLP (57) ABSTRACT

Methods, systems, and devices for wear leveling techniques using data characteristics are described. The described techniques provide for wear leveling across blocks of a memory system. A controller of the memory system may include additional criteria for determining a destination block for an operation, which may include a characteristic of data associated with the operation. The controller may select a destination block according to both an age of the block and the characteristic of the data. For example, the controller may select a relatively young block for data having a first characteristic and may select a relatively old block for data having a second characteristic. In some cases, the controller may partition free blocks into sub-pools based on an average age of virtual blocks (VBs) associated with each free block.

20 Claims, 5 Drawing Sheets

WEAR LEVELING TECHNIQUES USING DATA CHARACTERISTICS

CROSS REFERENCE

The present application for patent claims priority to U.S. Patent Application No. 63/459,866 by Cariello, entitled "WEAR LEVELING TECHNIQUES USING DATA CHARACTERISTICS," filed Apr. 17, 2023, which is assigned to the assignee hereof, and which is expressly incorporated by reference in its entirety herein.

TECHNICAL FIELD

The following relates to one or more systems for memory, including wear leveling techniques using data characteristics.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

A memory system may include a memory device having one or more blocks of memory cells. In some cases, a block (e.g., a physical block) of the memory device may include one or more decks (e.g., groupings of pages associated with the physical block). For instance, the block may include a first deck associated with an upper portion of the block and a second deck associated with a lower portion of the block. Such decks of a block may be referred to as sister decks and may share some structures (e.g., common layers such as a drain-end select gate (SGD) layer, a source-end select gate (SGS) layer, or the like) between the two decks. In some cases, the memory system may associate decks of the physical blocks with one or more virtual blocks (VBs), and may maintain a quantity of program erase cycles (PECs) for the one or more VBs associated with the decks. For example, a first VB may be associated with lower decks of a group of physical blocks and a second VB may be associated with the upper decks of the group of physical blocks, and the first VB and second VB may be referred to as sister VBs.

In some cases, a controller of the memory system may perform one or more operations on memory cells of the memory device (e.g., access operations, maintenance operations, internal refresh operations, or the like). As part of an operation, the controller may identify one or more free blocks (e.g., each deck of the one or more blocks available for writing data to) and may determine a destination block of the one or more free blocks for performing the operation. In some examples, the controller may determine the destination block according to an age of the destination block (e.g., a quantity of PECs for VBs associated with the destination block). For example, the controller may select a youngest block of the one or more free blocks (e.g., a VB having a lowest quantity of PECs) as the destination block for a write operation. However, data associated with the write operation may be classified as cold data (e.g., data expected to remain written for a relatively long duration). Thus, the controller may write cold data to a relatively young block, which may negatively impact an overall performance of the memory system due to significant differences in PEC counts between VBs. For example, if cold data is written to a young block, the older blocks may continue to see higher rates of PECs than the younger block that now includes cold data instead of hot data. Such conditions may cause some blocks to wear-out sooner than other blocks.

To support wear leveling across blocks of a memory system, a controller may include additional criterion for determining a destination block for an operation (e.g., a write operation). In some cases, the additional criterion may include a characteristic of data associated with the operation, which may indicate the data as hot data or cold data. The controller may select a destination block according to both an age of the block and the characteristic of the data. For example, the controller may select a relatively young block for hot data and may select a relatively old block for cold data. In some cases, the controller may partition free blocks into sub-pools (e.g., each containing half of the free blocks) based on an average age of the VBs associated with each free block, and may use a younger sub-pool for hot data and an older sub-pool for cold data. By selecting destination blocks according to the characteristic of the data, synchronization of PEC counts between VBs of the memory system may be improved, thereby improving the performance and health of the memory system.

In addition to applicability in memory systems as described herein, techniques for improved wear leveling techniques using data characteristics may be generally implemented to improve the performance of various electronic devices and systems (including artificial intelligence (AI) applications, augmented reality (AR) applications, virtual reality (VR) applications, and gaming). Some electronic device applications, including high-performance applications such as AI, AR, VR, and gaming, may be associated with relatively high processing requirements to satisfy user expectations. As such, increasing processing capabilities of the electronic devices by decreasing response times, improving power consumption, reducing complexity, increasing data throughput or access speeds, decreasing communication times, or increasing memory capacity or density, among other performance indicators, may improve user experience or appeal. Implementing the techniques described herein may improve the performance of electronic devices by facilitating wear leveling techniques using data characteristics, which may decrease processing or latency times, improve response times, or otherwise improve user experience, among other benefits.

Figure 1:
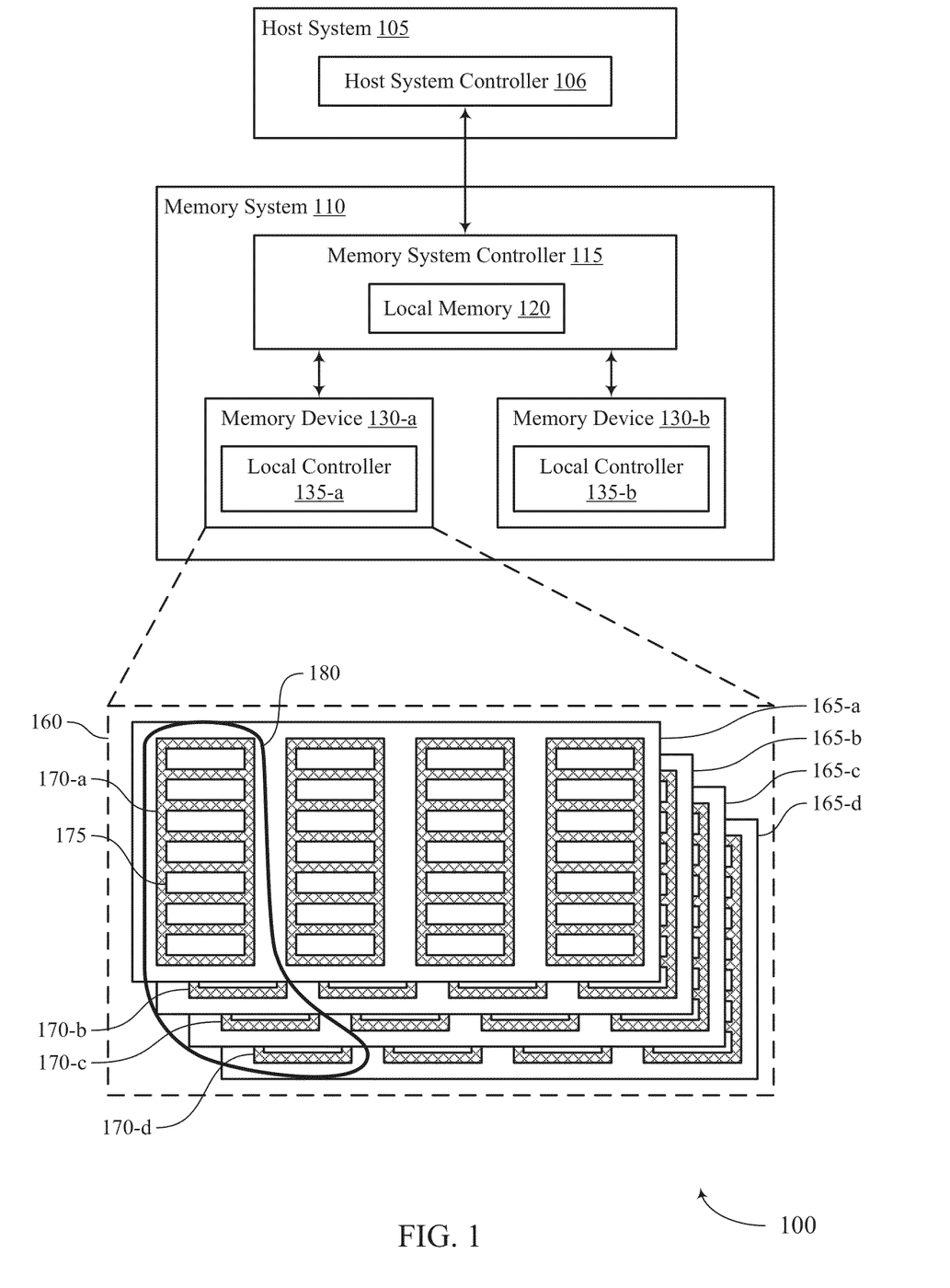
FIG. 1 illustrates an example of a system that supports wear leveling techniques using data characteristics in accordance with examples as disclosed herein.
Figure 2:
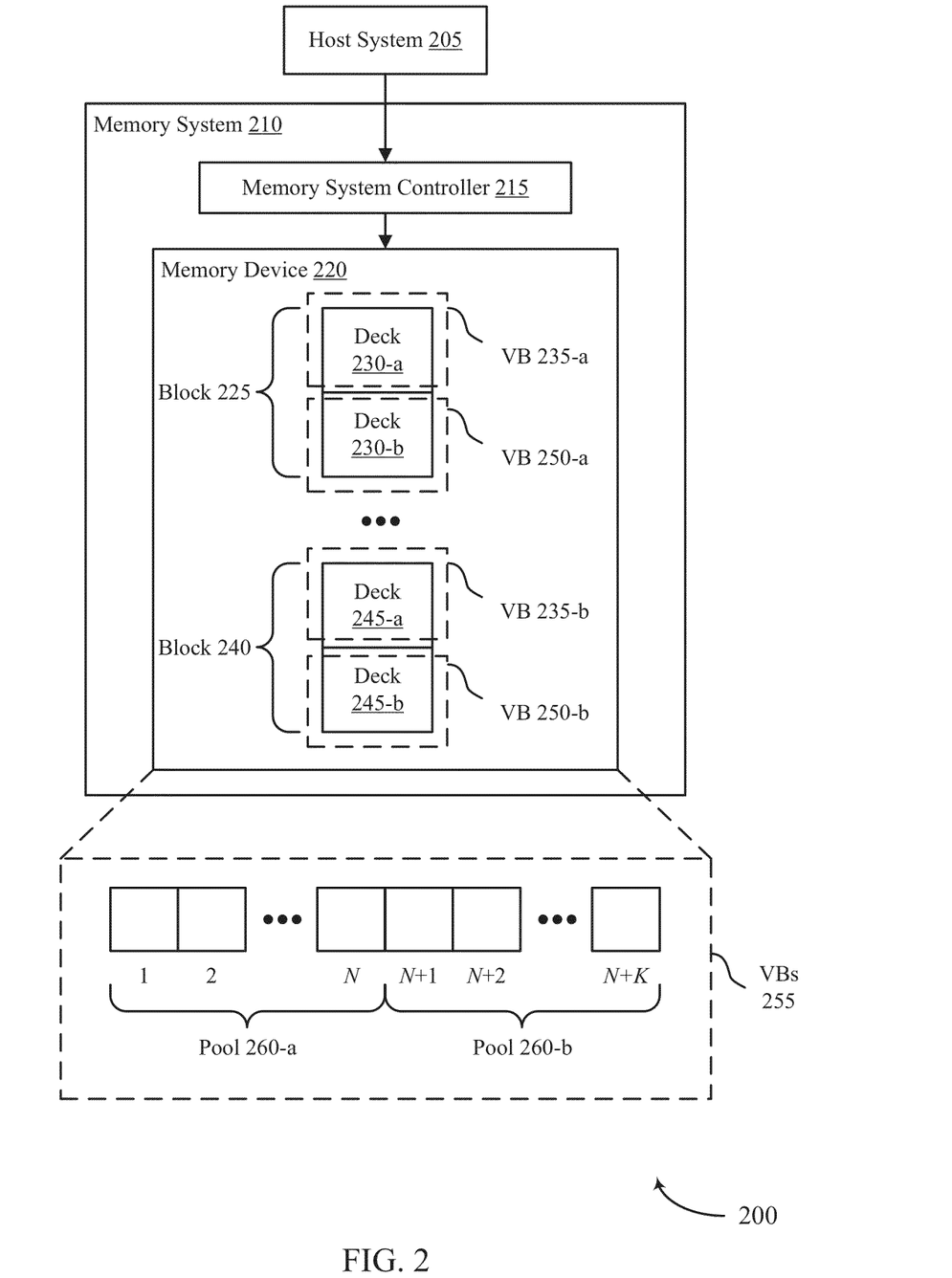
FIG. 2 illustrates an example of a system that supports wear leveling techniques using data characteristics in accordance with examples as disclosed herein.

Features of the disclosure are initially described in the context of systems, devices, and circuits with reference to FIGS. 1 through 2. Features of the disclosure are described in the context of a process flow with reference to FIG. 3. These and other features of the disclosure are further illustrated by and described in the context of an apparatus diagram and flowchart that relate to wear leveling techniques using data characteristics with reference to FIGS. 4 and 5.

FIG. 1 illustrates an example of a system 100 that supports wear leveling techniques using data characteristics in accordance with examples as disclosed herein. The system 100 includes a host system 105 coupled with a memory system 110. The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support wear leveling techniques using data characteristics. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

In some cases, the memory system controller 115 may perform one or more operations on one or more blocks 170 of the memory system 110 (e.g., access operations, maintenance operations, internal refresh operations, or the like). As part of an operation, the memory system controller 115 may identify one or more free blocks (e.g., each deck of the one or more blocks 170 available for writing data to) and may determine a destination block of the one or more free blocks for performing the operation. In some examples, the memory system controller 115 may determine the destination block according to an age of the destination block (e.g., a quantity of PECs for VBs associated with the destination block). For example, the memory system controller 115 may select a youngest block of the one or more free blocks (e.g., associated with VBs having a lowest quantity of PECs) as the destination block for a write operation. However, data associated with the write operation may be classified as cold data (e.g., expected to remain written for a relatively long duration). Thus, the memory system controller 115 may write cold data to a relatively young block, which may negatively impact an overall performance of the memory system due to significant differences in PEC counts between VBs.

To support wear leveling across blocks 170 of the memory system 110, the memory system controller 115 may include additional criterion for determining a destination block for an operation (e.g., a write operation). In some cases, the additional criterion may include a characteristic of data associated with the operation, which may indicate the data as hot data or cold data. The memory system controller 115 may select a destination block according to both an age of the block and the characteristic of the data. For example, the memory system controller 115 may select a relatively young block for hot data and may select a relatively old block for cold data. In some cases, the memory system controller 115 may partition free blocks into sub-pools (e.g., each containing half of the free blocks) based on an average age of the VBs associated with each free block, and may use a younger sub-pool for hot data and an older sub-pool for cold data. By selecting destination blocks according to the characteristic of the data, synchronization of PEC counts between VBs of the memory system 110 may be improved, thereby improving the performance and health of the memory system 110.

FIG. 2 illustrates an example of a system 200 that supports wear leveling techniques using data characteristics in accordance with examples as disclosed herein. The system 200 may be an example of a system 100 as described with reference to FIG. 1, or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively. The system 200 may support selecting a destination block for writing data to according to a characteristic of the data, which may improve synchronization of PEC counts between VBs of the memory system 210, thereby improving the performance and health of the memory system 210.

In some cases, memory system controller 215 may perform operations on one or more blocks of the memory device 220. For example, the memory system controller 215 may receive a command to write data to memory cells of the memory device 220. The memory system controller 215 may identify one or more decks associated with a respective block, which may be examples of groupings of pages within the block. For example, a block 225 may include a first deck 230-a (e.g., a grouping of upper pages of the block 225) and may include a second deck 230-b (e.g., a grouping of lower pages of the block 225). Such decks associated with a same block may be referred to as sister decks. Additionally, a first VB formed grouping upper decks of a group of blocks and a second VB formed grouping lower decks of the group of blocks may be referred as sister VBs.

For example, a VB 235 may be associated with (e.g., span) upper decks of a group of blocks of the memory device 220 (e.g., a group including at least the block 225 and the block 240) and a VB 250 may be associated with (e.g., span) lower decks of the group of blocks of the memory device 220. The VB 235 and the VB 250 may be examples of sister VBs, and may each be associated with a respective quantity of PECs that the VBs have undergone. A block may include any quantity of sister decks and is not limited to the quantity depicted in the system 200. Additionally, the memory device 220 may include any quantity of groups of blocks (e.g., each group associated with a respective set of sister VBs).

The memory system controller 215 may identify a list of VBs 255 (e.g., a list of free VBs according to firmware data) to determine a VB to perform an operation on (e.g., write data to). For example, the VBs 255 may include free VBs associated with each grouping of blocks of the memory device 220 and may each be associated with a respective quantity of PECs. In some cases, the memory system controller 215 may select a youngest VB of the blocks 225 (e.g., a VB associated with a lowest quantity of PECs) for writing data to in order to support synchronization of the PEC counts across VBs of the blocks 225. However, the data associated with the write command may be classified as cold data (e.g., data expected to remain written for a relatively long duration), and writing the cold data to the youngest VB may result in greater discrepancies in PEC counts between VBs of the memory device 220.

To support synchronized PEC counts for VBs of the memory device 220, the memory system controller 215 may select a destination VB for writing the data to according to a characteristic of the data. For example, the host system 205 may indicate (e.g., in the write command) a stream identifier (SID) associated with the data, which may classify the data as hot data or cold data. The memory system controller 215 may identify the characteristic of the data according to the SID, and may select the destination VB using the characteristic of the data as an additional criterion. For example, the memory system controller 215 may identify that the VB 235 has a lower PEC count than the VB 250 and may determine to write hot data to the VB 235 (e.g., reserving the VB 250 for writing cold data) or may determine to write cold data to the VB 250 (e.g., reserving the VB 235 for writing hot data).

The memory system controller 215 may extend such techniques to determine a destination VB between multiple candidate destination VBs. For example, the memory system controller may identify the set of free VBs 255, which may include the VB 235 and the VB 250, among other free VBs (e.g., VBs associated with other groups of blocks of the memory device 220). The memory system controller 215 may order the set of VBs 255 according to an age of each VB (e.g., a lowest PEC count to a highest PEC count). In some examples, the memory system controller 215 may partition the set of VBs 255 into one or more VB pools. As an example, the memory system controller 215 may form a pool 260-a from a first subset of the VBs 255 (e.g., $VB_1$ to $VB_N$) and may form a pool 260-b from a second subset of VBs 255 (e.g., $VB_{N+1}$ to $VB_{N+K}$).

In some cases, the memory system controller 215 may split the set of free VBs 255 according to an average quantity of PECs associated with the set of free VBs 255. For example, the memory system controller 215 may determine an average value corresponding to an average of the quantity of PECs associated with each VB of the VBs 255 (e.g., a global average PEC count). The memory system controller 215 may partition the VBs such that VBs having a PEC count below the global average value may be included in the pool 260-a and VBs having a PEC count above the global average value may be included in the pool 260-b.

In some cases, the memory system controller 215 may select a VB for writing data to according to the average PEC count for each set of sister VBs, a characteristic of the data, or both. The memory system controller 215 may identify the data characteristic based on a SID associated with the data, and may determine to write the data to a VB of the block pool 260-a (e.g., including relatively young VBs) or the block pool 260-b (e.g., including relatively old VBs) according to the data characteristic. For example, the memory system controller 215 may determine to write hot data to a VB of the block pool 260-a and may determine to write cold data to a VB of the block pool 260-b.

Additionally, the memory system controller 215 may determine an average PEC count for each set of sister VBs. For example, the memory system controller 215 may determine an average PEC count of the block 225 and 240 (e.g., an average of the quantity of PECs associated with the VB 235 and the VB 250). The memory system controller 215 may use this average value to sort the VBs 255 into the pools 260-a and 260-b and to identify a set of sister VBs to write data to. For example, the memory system controller 215 may (e.g., with a data identification procedure) use a younger set of sister VBs to write hot data and may use an older set of sister VBs to write cold data.

In some cases, the memory system controller 215 may select a VB of a selected set of sister VBs based on the quantity of PECs associated with each sister VB. For example, when writing hot data, if the block pool 260-*a* includes the sister VBs associated with the blocks 225 and 240 (e.g., the VB 235 and the VB 250), the memory system controller 215 may select VB 235 for writing data to if its PEC is smaller than the PEC of VB 250. In some cases, such as when the block pool 260-*a* includes multiple sets of free sister VBs, the memory system controller 215 may select a set of sister VBs according to a difference of the PEC counts (e.g., a delta value) between the sister VBs. For example, the memory system controller 215 may identify a first delta value associated with the VB 235 and the VB 250 (e.g., a first set of sister VBs) and may identify a second delta value associated with a second set of sister VBs. The memory system controller 215 may select the first set of sister VBs if the first delta value is greater than the second delta value, or may select the second set of sister VBs if the second delta value is greater than the first delta value.

In some examples, the memory system controller 215 may determine a weighted quantity of PECs associated with each VBs in 260 to determine a destination block for writing the data to. The memory system controller 215 may determine the weighted quantity of PECs of a block based on the average PEC count between sister VBs, the difference between the PEC count of each sister VB and the average, a first coefficient (e.g., $K_1$), a second coefficient (e.g., $K_2$), or a combination thereof. For example, the memory system controller 215 may calculate the weighted quantity of PECs of the VB 235 according to a product of the average PEC count for the sister VBs (e.g., the VB 235 and the VB 250) and the first coefficient summed with a product of the difference between the PEC count associated with the VB 235 and the average PEC count for the sister VBs and the second coefficient. In some cases, calculating the weighted quantity of PECs may enable the memory system controller 215 to prioritize a parameter of a VB (e.g., the average PEC count for sister VBs and the difference from the average PEC count) when selecting a destination VB. In some examples, the memory system controller 215 may configure the second coefficient to be positive (e.g., when selecting a VB from the pool 260-*a*) or may configure the second coefficient to be negative (e.g., when selecting a VB from the pool 260-*b*). Such techniques may support improved synchronization of PEC counts for VBs associated with the memory system 210, which may improve the performance and health of the memory system 210.

Figure 3:
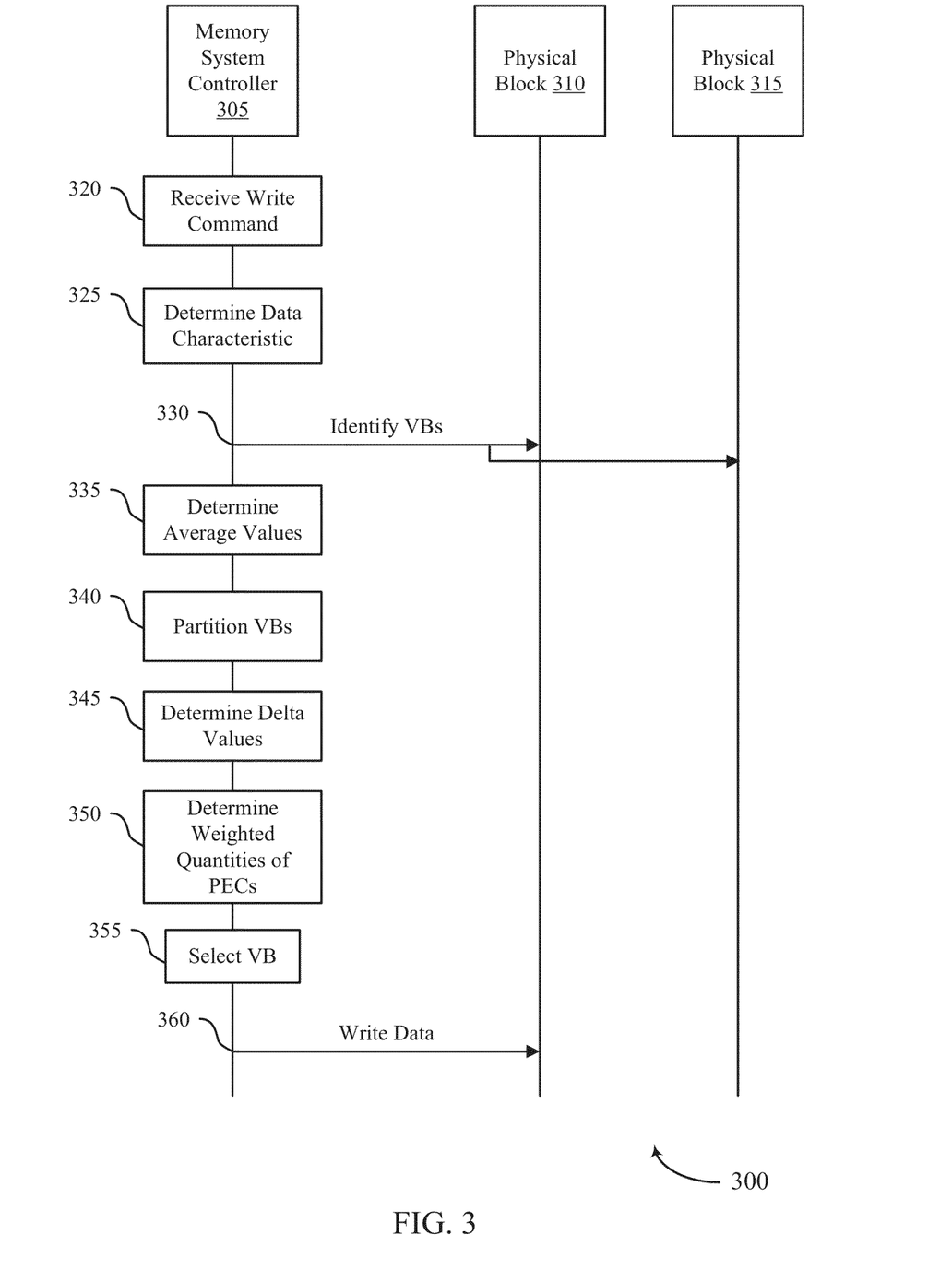
FIG. 3 illustrates an example of a process flow that supports wear leveling techniques using data characteristics in accordance with examples as disclosed herein.

FIG. 3 illustrates an example of a process flow 300 that supports wear leveling techniques using data characteristics in accordance with examples as disclosed herein. The process flow 300 may include one or more aspects of the system 100 and the system 200. For example, the process flow 300 may include a memory system controller 305, a physical block 310, and a physical block 315, which may be examples of the corresponding devices described herein, including with reference to FIGS. 1 and 2. The process flow 300 may support selecting a destination block for writing data to according to a characteristic of the data, which may improve synchronization of PEC counts between VBs of a memory system, thereby improving the performance and health of the memory system.

The process flow 300 may illustrate an example of the memory system controller 305 scanning virtual blocks associated with the physical block 310 and the physical block 315 to determine a destination block for writing data to. In some cases, the memory system controller 305 may be associated with a set of multiple physical blocks including the physical block 310 and the physical block 315. Alternative examples of the following may be implemented, where some processes are performed in a different order than described or are not performed. In some cases, processes may include additional features not mentioned below, or further processes may be added.

Aspects of the process flow 300 may be implemented by a memory system controller 305, among other components. Additionally, or alternatively, aspects of the process flow 300 may be implemented as instructions stored in memory (e.g., firmware stored in a memory coupled with a host system or a memory system). For example, the instructions, when executed by a controller (e.g., the memory system controller 305), may cause the controller to perform the operations of the process flow 300.

At 320, the memory system controller 305 may receive, from a host system, a command to write data to one or more memory cells of a memory system associated with the memory system controller 305. In some cases, the memory system may include multiple physical blocks that are each associated with at least two VBs of a set of multiple VBs.

At 325, the memory system controller 305 may determine a characteristic of the data based on receiving the command from the host system. For example, the command may include a SID associated with the data, and the memory system controller 305 may identify the data as hot data or as cold data according to the SID.

At 330, the memory system controller 305 may identify one or more VBs of a set of multiple VBs associated with the set of physical blocks 310 and the set of physical blocks 315 (e.g., from firmware data). For example, the memory system controller 305 may identify a first VB and a second VB that are associated with the set of physical blocks 310 (e.g., a first pair of sister VBs) and may identify a third VB and a fourth VB (e.g., a second pair of sister VBs) that are associated with the set of physical blocks 315. In some cases, the memory system controller 305 may identify a respective quantity of PECs associated with each of the first VB, the second VB, the third VB, and the fourth VB. In some cases, the VBs may be associated with decks of the set of physical blocks 310 and the set of physical blocks 315.

At 335, the memory system controller 305 may determine one or more average values associated with the multiple VBs identified at 330 (e.g., including at least the first VB, the second VB, the third VB, the fourth VB, or a combination thereof). For instance, the memory system controller 305 may determine a first average quantity of PECs associated with the first VB and the second VB (e.g., an average of the quantity of PECs associated with the first set of sister VBs) and may determine another average (e.g., a third average as referred to herein) quantity of PECs associated with the third VB and the fourth VB (e.g., an average of the quantity of PECs associated with the second set of sister VBs). Further, the memory system controller 305 may determine a second average corresponding to an average of the quantity of PECs associated with each VB of the multiple VBs (e.g., a global average quantity of PECs).

At 340, the memory system controller 305 may partition the multiple VBs into one or more sub-pools of VBs based on determining the one or more average values. For example, the memory system controller 305 may include one or more VBs of the multiple VBs having a respective average quantity of PECs that is less than the second average quantity of PECs in a first sub-pool (e.g., a first subset) and may include one or more VBs of the multiple VBs having a respective average quantity of PECs that is greater than the second average quantity of PECs in a second sub-pool (e.g., a second subset). In some cases, the memory system controller 305 may associate the first sub-pool and the second sub-pool with data having a respective characteristic. For example, the memory system controller 305 may associate the first sub-pool with data having a first characteristic (e.g., hot data or cold data) and may associate the second sub-pool with data having a second characteristic (e.g., hot data or cold data).

At 345, the memory system controller 305 may determine one or more delta values associated with the first average quantity of PECs (e.g., associated with the set of physical blocks 310), the third average quantity of PECs (e.g., associated with the set of physical blocks 315), and the second average quantity of PECs. For example, the memory system controller 305 may determine a first value (e.g., a first delta value) indicating a difference between the quantity of PECs associated with the first VB and the average quantity of PECs associated with the first set of sister VBs and may determine a second value (e.g., a second delta value) indicating a difference between the quantity of PECs associated with the third VB and the average quantity of PECs associated with the second set of sister VBs.

At 350, the memory system controller 305 may determine one or more weighted quantities of PECs associated with one or more blocks of the memory system. For example, the memory system controller 305 may determine a weighted quantity of PECs associated with the multiple VBs, where a first weighted quantity of PECs associated with the first VB is based on the first average quantity of PECs (e.g., for the set of sister VBs including the first VB and the second VB), the first value (e.g., the first delta value), a first coefficient, a second coefficient, or a combination thereof. In some examples, the memory system controller 305 may calculate the first weighted quantity of PECs according to a product of the first average quantity of PECs and the first coefficient summed with a product of the first value and the second coefficient. In some cases, the memory system controller 305 may configure the second coefficient to be positive (e.g., when selecting a VB from the first sub-pool) or may configure the second coefficient to be negative (e.g., when selecting a VB from the second sub-pool).

At 355, the memory system controller 305 may select a VB for writing the data to based on determining the average values, partitioning the VBs, determining the delta values, determining the weighted quantities of PECs, or a combination thereof. In one example, the memory system controller 305 may select a VB based on comparing the first value (e.g., the first delta value associated with the first VB) and the second value (e.g., the second delta value associated with the third VB). For example, if selecting a VB from the first sub-pool, the memory system controller 305 may select a VB of the physical block 310 (e.g., the first VB or the second VB) based on the first value being greater than the second value.

Additionally, or alternatively, if selecting a VB from the second sub-pool, the memory system controller 305 may select a VB of the physical block 310 (e.g., the first VB or the second VB) based on the first value being less than the second value. In another example, the memory system controller 305 may select a VB based on the weighted quantities of PECs associated with each VB. For example, the memory system controller 305 may select a VB of the physical block 310 based on comparing the first weighted quantity of PECs with a second weighted quantity of PECs associated with another physical block of the memory system (e.g., the physical block 315 or another physical block associated with at least a fifth VB).

At 360, the memory system controller 305 may write the data to the selected VB. For example, the memory system controller 305 may write the data to the first VB or the second VB (e.g., associated with the block 310) based on selecting the first VB or the second VB. By selecting a VB according to the characteristic of the data, synchronization of PEC counts for VBs of the memory system may be improved, thereby improving the performance and health of the memory system.

Figure 4:
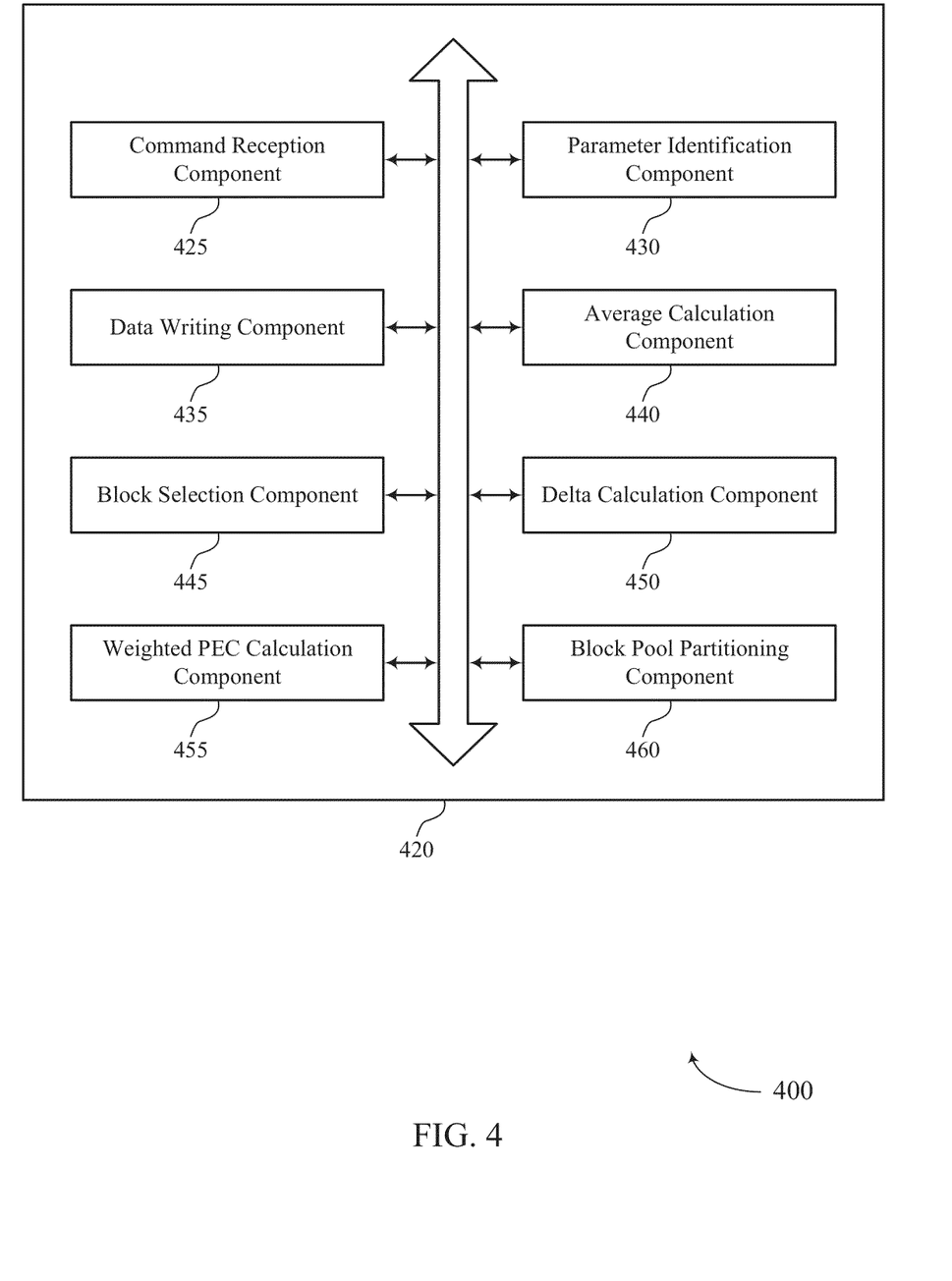
FIG. 4 illustrates a block diagram of a memory system that supports wear leveling techniques using data characteristics in accordance with examples as disclosed herein.

FIG. 4 illustrates a block diagram 400 of a memory system 420 that supports wear leveling techniques using data characteristics in accordance with examples as disclosed herein. The memory system 420 may be an example of aspects of a memory system as described with reference to FIGS. 1 through 3. The memory system 420, or various components thereof, may be an example of means for performing various aspects of wear leveling techniques using data characteristics as described herein. For example, the memory system 420 may include a command reception component 425, a parameter identification component 430, a data writing component 435, an average calculation component 440, a block selection component 445, a delta calculation component 450, a weighted PEC calculation component 455, a block pool partitioning component 460, or any combination thereof. Each of these components may communicate, directly or indirectly, with one another (e.g., via one or more buses).

The command reception component 425 may be configured as or otherwise support a means for receiving a command to write data to one or more memory cells of a memory system, the memory system including a plurality of physical blocks that are each associated with at least two virtual blocks of a plurality of virtual blocks. The parameter identification component 430 may be configured as or otherwise support a means for determining, based at least in part on receiving the command, a characteristic of the data and a respective quantity of program erase cycles associated with a first virtual block and a second virtual block of the plurality of virtual blocks. The data writing component 435 may be configured as or otherwise support a means for writing the data to the first virtual block or the second virtual block of a first physical block of the plurality of virtual blocks based at least in part on the characteristic of the data and the respective quantity of program erase cycles associated with the first virtual block and the second virtual block of the plurality of virtual blocks.

In some examples, the average calculation component 440 may be configured as or otherwise support a means for determining a first average of a quantity of program erase cycles associated with the first virtual block and the second virtual block. In some examples, the block selection component 445 may be configured as or otherwise support a means for selecting the first virtual block to write the data to based at least in part on determining the first average of the quantity of program erase cycles associated with the first virtual block and the second virtual block.

In some examples, to support selecting the first virtual block, the average calculation component 440 may be configured as or otherwise support a means for determining a second average of the quantity of program erase cycles associated with a plurality of virtual blocks associated with the plurality of physical blocks. In some examples, to support selecting the first virtual block, the block selection component 445 may be configured as or otherwise support a means for selecting the first virtual block to write the data to based at least in part on comparing the first average of the quantity of program erase cycles to the second average of the quantity of program erase cycles.

In some examples, to support selecting the first virtual block, the delta calculation component 450 may be configured as or otherwise support a means for determining a first value indicating a difference between the first average of the quantity of program erase cycles and the second average of the quantity of program erase cycles. In some examples, to support selecting the first virtual block, the delta calculation component 450 may be configured as or otherwise support a means for determining a second value indicating a difference between a third average of the quantity of program erase cycles associated with a third virtual block and a fourth virtual block associated with a second physical block of the plurality of physical blocks and the second average of the quantity of program erase cycles. In some examples, to support selecting the first virtual block, the block selection component 445 may be configured as or otherwise support a means for selecting the first virtual block based at least in part on the first value being greater than the second value.

In some examples, to support selecting the first virtual block, the weighted PEC calculation component 455 may be configured as or otherwise support a means for determining a weighted quantity of program erase cycles associated with the plurality of virtual blocks, where a first weighted quantity of program erase cycles associated with the first virtual block is based at least in part on the first average of the quantity of program erase cycles, a difference between the first average of the quantity of program erase cycles and the second average of the quantity of program erase cycles, a first coefficient, a second coefficient, or any combination thereof. In some examples, to support selecting the first virtual block, the block selection component 445 may be configured as or otherwise support a means for selecting the first virtual block based at least in part on comparing the first weighted quantity of program erase cycles with a second weighted quantity of program erase cycles associated with a fifth virtual block of the plurality of virtual blocks.

In some examples, the block pool partitioning component 460 may be configured as or otherwise support a means for identifying a first subset of the plurality of virtual blocks and a second subset of the plurality of virtual blocks based at least in part on the second average of the quantity of program erase cycles associated with each virtual block of the plurality of virtual blocks, where the first subset is associated with data having a first characteristic and the second subset is associated with data having a second characteristic.

In some examples, the first subset includes one or more virtual blocks of the plurality of virtual blocks having a respective average of the quantity of program erase cycles that is less than the second average of the quantity of program erase cycles; and the second subset includes one or more virtual blocks of the plurality of virtual blocks having a respective average of the quantity of program erase cycles that is greater than the second average of the quantity of program erase cycles.

In some examples, the parameter identification component 430 may be configured as or otherwise support a means for identifying the characteristic of the data based at least in part on a stream identifier associated with the data.

In some examples, the first virtual block includes memory cells of a first deck of a first physical block and the second virtual block includes memory cells of a second deck of the first physical block.

Figure 5:
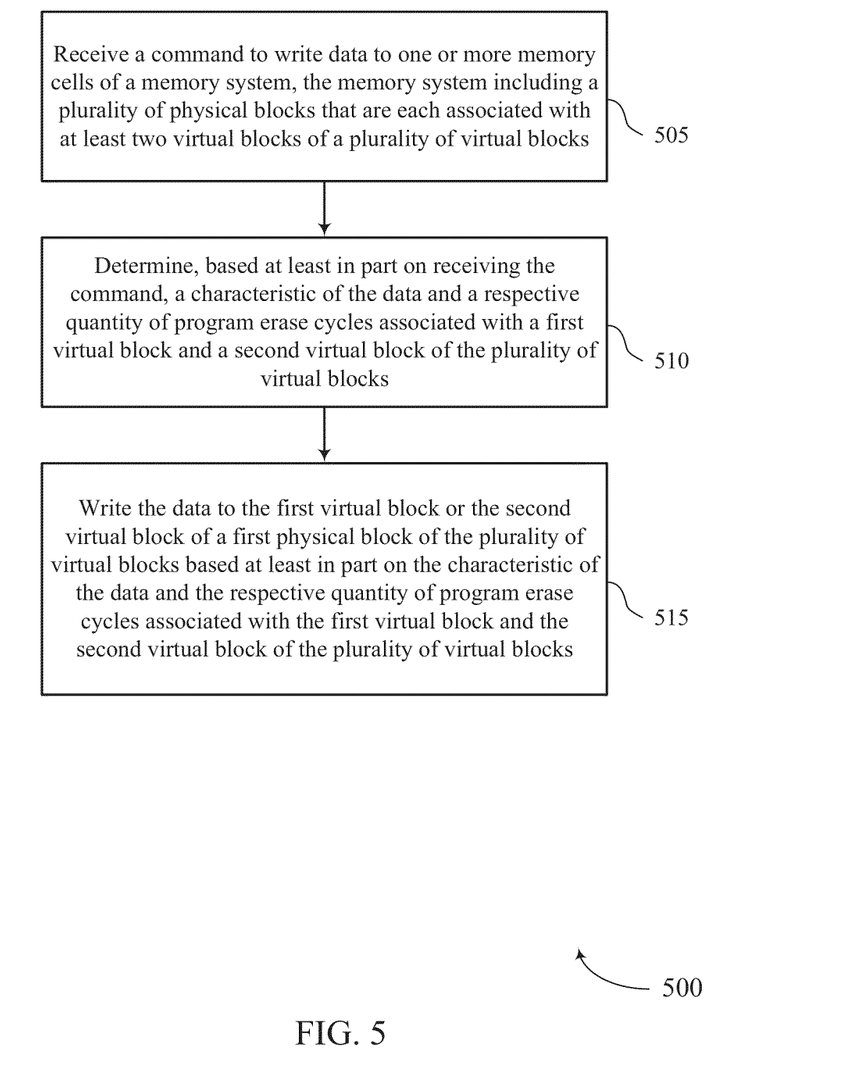
FIG. 5 illustrates a flowchart showing a method or methods that support wear leveling techniques using data characteristics in accordance with examples as disclosed herein.

FIG. 5 illustrates a flowchart showing a method 500 that supports wear leveling techniques using data characteristics in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 505, the method may include receiving a command to write data to one or more memory cells of a memory system, the memory system including a plurality of physical blocks that are each associated with at least two virtual blocks of a plurality of virtual blocks. The operations of 505 may be performed in accordance with examples as disclosed herein. In some examples, aspects of the operations of 505 may be performed by a command reception component 425 as described with reference to FIG. 4.

At 510, the method may include determining, based at least in part on receiving the command, a characteristic of the data and a respective quantity of program erase cycles associated with a first virtual block and a second virtual block of the plurality of virtual blocks. The operations of 510 may be performed in accordance with examples as disclosed herein. In some examples, aspects of the operations of 510 may be performed by a parameter identification component 430 as described with reference to FIG. 4.

At 515, the method may include writing the data to the first virtual block or the second virtual block of a first physical block of the plurality of virtual blocks based at least in part on the characteristic of the data and the respective quantity of program erase cycles associated with the first virtual block and the second virtual block of the plurality of virtual blocks. The operations of 515 may be performed in accordance with examples as disclosed herein. In some examples, aspects of the operations of 515 may be performed by a data writing component 435 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving a command to write data to one or more memory cells of a memory system, the memory system including a plurality of physical blocks that are each associated with at least two virtual blocks of a plurality of virtual blocks; determining, based at least in part on receiving the command, a characteristic of the data and a respective quantity of program erase cycles associated with a first virtual block and a second virtual block of the plurality of virtual blocks; and writing the data to the first virtual block or the second virtual block of a first physical block of the plurality of virtual blocks based at least in part on the characteristic of the data and the respective quantity of program erase cycles associated with the first virtual block and the second virtual block of the plurality of virtual blocks.

Aspect 2: The method, apparatus, or non-transitory computer-readable medium of aspect 1, further including operations, features, circuitry, logic, means, or instructions, or any combination thereof for determining a first average of a quantity of program erase cycles associated with the first virtual block and the second virtual block and selecting the first virtual block to write the data to based at least in part on determining the first average of the quantity of program erase cycles associated with the first virtual block and the second virtual block.

Aspect 3: The method, apparatus, or non-transitory computer-readable medium of aspect 2, where selecting the first virtual block includes operations, features, circuitry, logic, means, or instructions, or any combination thereof for determining a second average of the quantity of program erase cycles associated with a plurality of virtual blocks associated with the plurality of physical blocks and selecting the first virtual block to write the data to based at least in part on comparing the first average of the quantity of program erase cycles to the second average of the quantity of program erase cycles.

Aspect 4: The method, apparatus, or non-transitory computer-readable medium of aspect 3, where selecting the first virtual block further includes operations, features, circuitry, logic, means, or instructions, or any combination thereof for determining a first value indicating a difference between the first average of the quantity of program erase cycles and the second average of the quantity of program erase cycles; determining a second value indicating a difference between a third average of the quantity of program erase cycles associated with a third virtual block and a fourth virtual block associated with a second physical block of the plurality of physical blocks and the second average of the quantity of program erase cycles; and selecting the first virtual block based at least in part on the first value being greater than the second value.

Aspect 5: The method, apparatus, or non-transitory computer-readable medium of any of aspects 3 through 4, where selecting the first virtual block further includes operations, features, circuitry, logic, means, or instructions, or any combination thereof for determining a weighted quantity of program erase cycles associated with the plurality of virtual blocks, where a first weighted quantity of program erase cycles associated with the first virtual block is based at least in part on the first average of the quantity of program erase cycles, a difference between the first average of the quantity of program erase cycles and the second average of the quantity of program erase cycles, a first coefficient, a second coefficient, or any combination thereof and selecting the first virtual block based at least in part on comparing the first weighted quantity of program erase cycles with a second weighted quantity of program erase cycles associated with a fifth virtual block of the plurality of virtual blocks.

Aspect 6: The method, apparatus, or non-transitory computer-readable medium of any of aspects 3 through 5, further including operations, features, circuitry, logic, means, or instructions, or any combination thereof for identifying a first subset of the plurality of virtual blocks and a second subset of the plurality of virtual blocks based at least in part on the second average of the quantity of program erase cycles associated with each virtual block of the plurality of virtual blocks, where the first subset is associated with data having a first characteristic and the second subset is associated with data having a second characteristic.

Aspect 7: The method, apparatus, or non-transitory computer-readable medium of aspect 6, where the first subset includes one or more virtual blocks of the plurality of virtual blocks having a respective average of the quantity of program erase cycles that is less than the second average of the quantity of program erase cycles; and the second subset includes one or more virtual blocks of the plurality of virtual blocks having a respective average of the quantity of program erase cycles that is greater than the second average of the quantity of program erase cycles.

Aspect 8: The method, apparatus, or non-transitory computer-readable medium of any of aspects 1 through 7, further including operations, features, circuitry, logic, means, or instructions, or any combination thereof for identifying the characteristic of the data based at least in part on a stream identifier associated with the data.

Aspect 9: The method, apparatus, or non-transitory computer-readable medium of any of aspects 1 through 8, where the first virtual block includes memory cells of a first deck of a first physical block and the second virtual block includes memory cells of a second deck of the first physical block.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
    a memory device; and
    a controller coupled with the memory device and configured to cause the apparatus to:
        receive a command to write data to one or more memory cells of the memory device, the memory device comprising a plurality of physical blocks that are each associated with at least two virtual blocks of a plurality of virtual blocks;
        determine, based at least in part on receiving the command, a characteristic of the data and a respective quantity of program erase cycles associated with a first virtual block and a second virtual block of the plurality of virtual blocks; and
        write the data to the first virtual block or the second virtual block of a first physical block of the plurality of virtual blocks based at least in part on the characteristic of the data and the respective quantity of program erase cycles associated with the first virtual block and the second virtual block of the plurality of virtual blocks.

2. The apparatus of claim 1, wherein the controller is further configured to cause the apparatus to:
    determine a first average of a quantity of program erase cycles associated with the first virtual block and the second virtual block; and
    select the first virtual block to write the data to based at least in part on determining the first average of the quantity of program erase cycles associated with the first virtual block and the second virtual block.

3. The apparatus of claim 2, wherein, to select the first virtual block, the controller is configured to cause the apparatus to:
    select the first virtual block to write the data to based at least in part on comparing the first average of the quantity of program erase cycles to a second average of the quantity of program erase cycles.

4. The apparatus of claim 3, wherein, to select the first virtual block, the controller is configured to cause the apparatus to:
    determine a first value indicating a difference between the first average of the quantity of program erase cycles and the quantity of program erase cycles associated with the first virtual block;
    determine a second value indicating a difference between a third average of the quantity of program erase cycles associated with a third virtual block and a fourth virtual block associated with a second physical block of the plurality of physical blocks and the quantity of program erase cycles associated with the third virtual block; and
    select the first virtual block based at least in part on the first value being greater than the second value.

5. The apparatus of claim 3, wherein, to select the first virtual block, the controller is configured to cause the apparatus to:
    determine a weighted quantity of program erase cycles associated with the plurality of virtual blocks, wherein a first weighted quantity of program erase cycles associated with the first virtual block is based at least in part on the first average of the quantity of program erase cycles, a difference between the first average of the quantity of program erase cycles and the second average of the quantity of program erase cycles, a first coefficient, a second coefficient, or any combination thereof; and
    select the first virtual block based at least in part on comparing the first weighted quantity of program erase cycles with a second weighted quantity of program erase cycles associated with a fifth virtual block of the plurality of virtual blocks.

6. The apparatus of claim 2, wherein the controller is further configured to cause the apparatus to:
    determine a second average of the quantity of program erase cycles associated with the plurality of virtual blocks associated with the plurality of physical blocks; and
    identify a first subset of the plurality of virtual blocks and a second subset of the plurality of virtual blocks based at least in part on the second average of the quantity of program erase cycles associated with each virtual block of the plurality of virtual blocks, wherein the first subset is associated with data having a first characteristic and the second subset is associated with data having a second characteristic.

7. The apparatus of claim 6, wherein the first subset comprises one or more virtual blocks of the plurality of virtual blocks having a respective average of the quantity of program erase cycles that is less than the second average of the quantity of program erase cycles; and the second subset comprises one or more virtual blocks of the plurality of virtual blocks having a respective average of the quantity of program erase cycles that is greater than the second average of the quantity of program erase cycles.

8. The apparatus of claim 1, wherein the controller is further configured to cause the apparatus to:
 identify the characteristic of the data based at least in part on a stream identifier associated with the data.

9. The apparatus of claim 1, wherein the first virtual block comprises memory cells of a first deck of a first physical block and the second virtual block comprises memory cells of a second deck of the first physical block.

10. A non-transitory computer-readable medium storing code comprising instructions which, when executed by a processor of an electronic device, cause the electronic device to:
 receive a command to write data to one or more memory cells of a memory system, the memory system comprising a plurality of physical blocks that are each associated with at least two virtual blocks of a plurality of virtual blocks;
 determine, based at least in part on receiving the command, a characteristic of the data and a respective quantity of program erase cycles associated with a first virtual block and a second virtual block of the plurality of virtual blocks; and
 write the data to the first virtual block or the second virtual block of a first physical block of the plurality of virtual blocks based at least in part on the characteristic of the data and the respective quantity of program erase cycles associated with the first virtual block and the second virtual block of the plurality of virtual blocks.

11. The non-transitory computer-readable medium of claim 10, wherein the instructions, when executed by the processor of the electronic device, further cause the electronic device to:
 determine a first average of a quantity of program erase cycles associated with the first virtual block and the second virtual block; and
 select the first virtual block to write the data to based at least in part on determining the first average of the quantity of program erase cycles associated with the first virtual block and the second virtual block.

12. The non-transitory computer-readable medium of claim 11, wherein the instructions to select the first virtual block, when executed by the processor of the electronic device, cause the electronic device to:
 select the first virtual block to write the data to based at least in part on comparing the first average of the quantity of program erase cycles to a second average of the quantity of program erase cycles.

13. The non-transitory computer-readable medium of claim 12, wherein the instructions to select the first virtual block, when executed by the processor of the electronic device, cause the electronic device to:

determine a first value indicating a difference between the first average of the quantity of program erase cycles and the quantity of program erase cycles associated with the first virtual block;
 determine a second value indicating a difference between a third average of the quantity of program erase cycles associated with a third virtual block and a fourth virtual block associated with a second physical block of the plurality of physical blocks and a quantity of program erase cycles associated with the third virtual block; and
 select the first virtual block based at least in part on the first value being greater than the second value.

14. The non-transitory computer-readable medium of claim 12, wherein the instructions to select the first virtual block, when executed by the processor of the electronic device, cause the electronic device to:
 determine a weighted quantity of program erase cycles associated with the plurality of virtual blocks, wherein a first weighted quantity of program erase cycles associated with the first virtual block is based at least in part on the first average of the quantity of program erase cycles, a difference between the first average of the quantity of program erase cycles and the second average of the quantity of program erase cycles, a first coefficient, a second coefficient, or any combination thereof; and
 select the first virtual block based at least in part on comparing the first weighted quantity of program erase cycles with a second weighted quantity of program erase cycles associated with a fifth virtual block of the plurality of virtual blocks.

15. The non-transitory computer-readable medium of claim 12, wherein the instructions, when executed by the processor of the electronic device, further cause the electronic device to:
 determine a second average of the quantity of program erase cycles associated with the plurality of virtual blocks associated with the plurality of physical blocks; and
 identify a first subset of the plurality of virtual blocks and a second subset of the plurality of virtual blocks based at least in part on the second average of the quantity of program erase cycles associated with each virtual block of the plurality of virtual blocks, wherein the first subset is associated with data having a first characteristic and the second subset is associated with data having a second characteristic.

16. The non-transitory computer-readable medium of claim 15, wherein the first subset comprises one or more virtual blocks of the plurality of virtual blocks having a respective average of the quantity of program erase cycles that is less than the second average of the quantity of program erase cycles; and the second subset comprises one or more virtual blocks of the plurality of virtual blocks having a respective average of the quantity of program erase cycles that is greater than the second average of the quantity of program erase cycles.

17. The non-transitory computer-readable medium of claim 10, wherein the instructions, when executed by the processor of the electronic device, further cause the electronic device to:
 identify the characteristic of the data based at least in part on a stream identifier associated with the data.

18. The non-transitory computer-readable medium of claim 10, wherein the first virtual block comprises memory cells of a first deck of a first physical block and the second virtual block comprises memory cells of a second deck of the first physical block.

19. A method, comprising:
   receiving a command to write data to one or more memory cells of a memory system, the memory system comprising a plurality of physical blocks that are each associated with at least two virtual blocks of a plurality of virtual blocks;
   determining, based at least in part on receiving the command, a characteristic of the data and a respective quantity of program erase cycles associated with a first virtual block and a second virtual block of the plurality of virtual blocks; and
   writing the data to the first virtual block or the second virtual block of a first physical block of the plurality of virtual blocks based at least in part on the characteristic of the data and the respective quantity of program erase cycles associated with the first virtual block and the second virtual block of the plurality of virtual blocks.

20. The method of claim 19, further comprising:
   determining a first average of a quantity of program erase cycles associated with the first virtual block and the second virtual block; and
   selecting the first virtual block to write the data to based at least in part on determining the first average of the quantity of program erase cycles associated with the first virtual block and the second virtual block.

* * * * *